United States Patent
Lin et al.

(10) Patent No.: US 12,556,985 B2
(45) Date of Patent: Feb. 17, 2026

(54) WIRELESS COMMUNICATION APPARATUS ON VEHICLE AND WIRELESS COMMUNICATION METHOD

(71) Applicant: Moxa Inc., New Taipei (TW)

(72) Inventors: Ta-Sheng Lin, New Taipei (TW); Jing-You Yan, New Taipei (TW); Hung-Yu Wei, New Taipei (TW)

(73) Assignee: Moxa Inc., New Taipei (TW)

( * ) Notice: Subject to any disclaimer, the term of this patent is extended or adjusted under 35 U.S.C. 154(b) by 547 days.

(21) Appl. No.: 18/151,467

(22) Filed: Jan. 9, 2023

(65) Prior Publication Data

US 2023/0422112 A1   Dec. 28, 2023

Related U.S. Application Data

(60) Provisional application No. 63/354,692, filed on Jun. 23, 2022.

(51) Int. Cl.
*H04W 36/00* (2009.01)
*H04W 36/16* (2009.01)

(52) U.S. Cl.
CPC ..... *H04W 36/0072* (2013.01); *H04W 36/165* (2013.01)

(58) Field of Classification Search
CPC .......... H04W 36/0072; H04W 36/165; H04W 36/0069; H04W 36/026; H04W 36/08;
(Continued)

(56) References Cited

U.S. PATENT DOCUMENTS

| 11,323,168 B2 | 5/2022 | Legg et al. |
| 2008/0095134 A1* | 4/2008 | Chen ............... H04W 40/32 370/342 |

(Continued)

FOREIGN PATENT DOCUMENTS

| CN | 114642009 | 6/2022 |
| EP | 3817413 | 5/2021 |

(Continued)

OTHER PUBLICATIONS

"Search Report of Europe Counterpart Application", issued on Nov. 20, 2023, p. 1-p. 13.

(Continued)

*Primary Examiner* — Ricky Q Ngo
*Assistant Examiner* — Kabir U Jahangir
(74) *Attorney, Agent, or Firm* — JCIPRNET

(57) ABSTRACT

According to an aspect of the disclosure, the disclosure is directed to a wireless communication apparatus on a vehicle. The wireless communication the apparatus includes (not limited to): first wireless transceiver configured to transmit and receive data on a first communication path; a second wireless transceiver configured to transmit and receive data on a second communication path; and a processor electrically connected to the first wireless transceiver and the second wireless transceiver and configured at least to: establish, as a default mean of communication, multiple communication paths; transmit by the first wireless transceiver, as the default mean of communication, a first data packet to the network located outside of the vehicle on a first communication path; and transmit by the second wireless transceiver, as the default mean of communication, a first duplicated data packet of the first data packet to the network on a second communication path.

20 Claims, 12 Drawing Sheets

(58) Field of Classification Search
CPC ... H04W 36/185; H04W 88/06; H04W 76/15; H04W 24/04; H04W 36/06; H04B 1/3822; H04B 1/40
See application file for complete search history.

(56) References Cited

U.S. PATENT DOCUMENTS

| | | | |
|---|---|---|---|
| 2018/0054783 A1* | 2/2018 | Luo | H04W 52/146 |
| 2019/0239112 A1* | 8/2019 | Rao | H04L 1/08 |
| 2019/0359235 A1 | 11/2019 | Aoyama et al. | |
| 2021/0274595 A1 | 9/2021 | McConnell | |
| 2021/0345204 A1 | 11/2021 | Matolia et al. | |
| 2022/0167226 A1 | 5/2022 | Chin et al. | |
| 2022/0312226 A1* | 9/2022 | Legg | H04B 7/0617 |
| 2024/0064584 A1* | 2/2024 | You | H04W 36/0072 |

FOREIGN PATENT DOCUMENTS

| | | |
|---|---|---|
| JP | 2012182735 | 9/2012 |
| TW | 202133652 | 9/2021 |
| WO | 2018146795 | 8/2018 |

OTHER PUBLICATIONS

"Notice of allowance of Japan Counterpart Application", issued on Nov. 29, 2024, p. 1-p. 3.
"Office Action of Japan Counterpart Application", issued on Jun. 27, 2024, p. 1-p. 4.

* cited by examiner

WIRELESS COMMUNICATION APPARATUS ON VEHICLE AND WIRELESS COMMUNICATION METHOD

CROSS-REFERENCE TO RELATED APPLICATION

This application claims the priority benefit of U.S. provisional application Ser. No. 63/354,692, filed on Jun. 23, 2022. The entirety of the above-mentioned patent application is hereby incorporated by reference herein and made a part of this specification.

TECHNICAL FIELD

The disclosure is directed to a wireless communication apparatus on a vehicle and a wireless communication method performed by the wireless communication apparatus on the vehicle.

BACKGROUND

The fifth-generation (5G) communication technology is a relatively new technology of cellular networks. Current commercial 5G networks enable a user equipment (UE) to have a wireless connection under a higher data rate than a fourth-generation (4G) communication network. However, when it comes to other performances such as reliabilities and latency jitters under moving scenarios, the current commercial 5G network might not better than the current 4G communication networks. Consequently, network operators could be hesitant when considering whether to deploy a 5G network onto a scenario in which high reliability and low latency requirements are necessary.

One example of such scenario involves developing a train control module in a railway environment. For the train control module, the train is assumed to have a wireless data connection with one or more central controllers located at fixed locations, and the data transmitted through the wireless data connection may include important control messages for controlling the train moving at a very high speed. Under such scenario, the data connection with a central controller could be time-sensitive and may have a requirement for having a low latency. If such requirements could not be met, there could be safety related concerns. Moreover, the train control module also needs to have a low packet loss rate (PLR). Without a low PRL, the communication could be considered as being unreliable, and the time to re-transmit data packets would lead to excessive data latency.

Various publications have described the causes for the high PLR or the excessive data latency of the current commercial 5G communication networks with elaborated experiments and their corresponding outcomes. Essentially, handovers (HO) and Radio Link Failures (RLF) have been identified as two most common factors leading to the problems of the high PLR and excessive data latency under current 5G networks. With these insights, endeavors could be made to enhance the performances of the current 5G networks by reducing the impact of the HOs and RLFs of the data traffic.

SUMMARY OF THE DISCLOSURE

Accordingly, in order to meet the above-described challenges, the disclosure is directed to a wireless communication apparatus on a vehicle and a wireless communication method performed by the wireless communication apparatus on the vehicle.

In an aspect, the disclosure is directed to a wireless communication apparatus on a vehicle, and the wireless communication apparatus includes but not limited to: a first wireless transceiver configured to transmit and receive data on a first communication path, a second wireless transceiver configured to transmit and receive data on a second communication path, and a processor electrically connected to the first wireless transceiver and the second wireless transceiver. The processor is configured at least to: establish, as a default mean of communication, multiple communication paths comprising the first communication path on a first channel selected out of a first subset of channels of a first plurality of available channels of the first wireless transceiver and the second communication path on a second channel selected out of a second subset of channels of a second plurality of available channels of the second wireless transceiver; transmit by the first wireless transceiver, as the default mean of communication, a first data packet to the network located outside of the vehicle on the first communication path; transmit by the second wireless transceiver, as the default mean of communication, a first duplicated data packet of the first data packet to the network on the second communication path; perform, by the first wireless transceiver, a first handover (HO) procedure at a first time period by selecting, from the first subset of channels, a third channel; and transmit, through the third channel, a second data packet on the first communication path in response to completing the first HO, and a second duplicated data packet of the second data packet on the second communication path which remains on the second channel.

In an aspect, the disclosure is directed to wireless communication method performed by the wireless communication apparatus on the vehicle, the method includes but not limited to establishing, as a default mean of communication, multiple communication paths comprising the first communication path on a first channel selected out of a first subset of channels of a first plurality of available channels of the first wireless transceiver and the second communication path on a second channel selected out of a second subset of channels of a second plurality of available channels of the second wireless transceiver; transmitting by the first wireless transceiver, as the default mean of communication, a first data packet to the network located outside of the vehicle on the first communication path; transmitting by the second wireless transceiver, as the default mean of communication, a first duplicated data packet of the first data packet to the network on the second communication path; performing, by the first wireless transceiver, a first handover (HO) procedure at a first time period by selecting, from the first subset of channels, a third channel; and transmitting, through the third channel, a second data packet on the first communication path in response to completing the first HO, and a second duplicated data packet of the second data packet on the second communication path which remains on the second channel.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
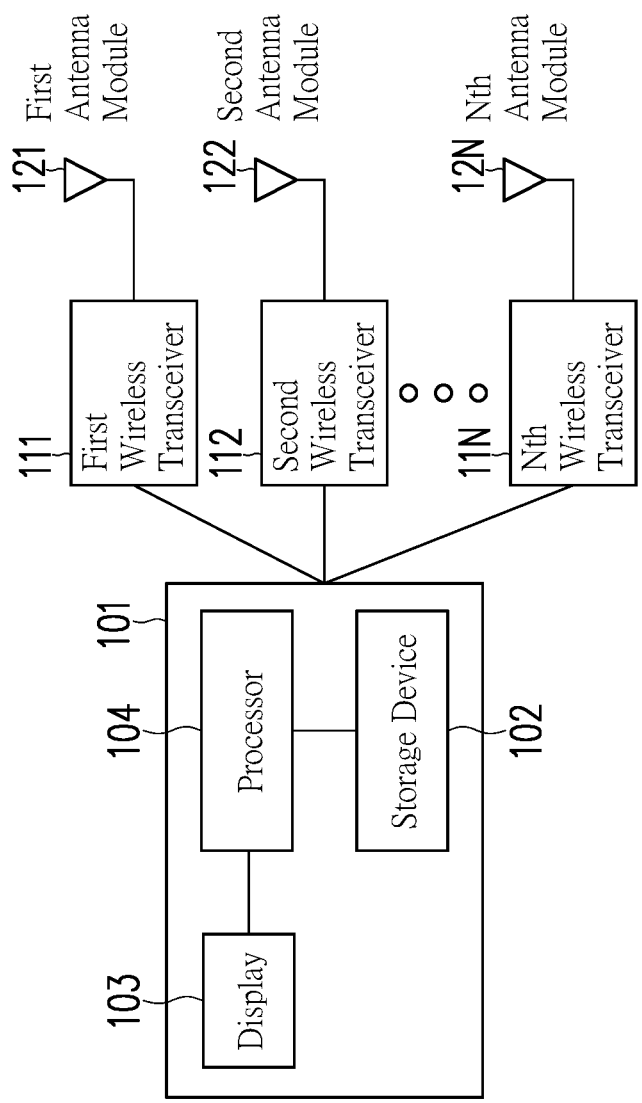
FIG. 1 illustrates a hardware block diagram of the wireless communication apparatus according to one of the exemplary embodiments of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

In order to resolve the problems related to the high PLRs and excessive data latency under current 5G networks as previously described, the disclosure provides a wireless communication apparatus on a vehicle and a wireless communication method performed by the wireless communication apparatus on the vehicle. The apparatus and the method utilize techniques including a technique of multipath transmission and a technique of band locking. Multipath transmission is a technique by which a user may connect to a network with a connection that uses multiple paths simultaneously. For example, if a user is using the internet when situated within a moving train or a moving car, the user makes the connection to the internet by using a terminal device (e.g. cell phone, laptop, PDA, etc.) that either contains multiple wireless interfaces or is able to connected to the multiple wireless interfaces provided by the wireless communication apparatus, and each of the multiple wireless interfaces would establish one's own data path. For each data paths of the multiple data paths, duplicated data packets by default are transmitted through each of the data paths in order to increase the reliability of the transmissions. The phrase "by default" means that the wireless communication apparatus always seeks to transmit duplicated data packets through two or more data paths unless it is impossible to do so, such as when the wireless communication apparatus is only able to lock onto signals from one base station or is not able to lock onto any signal from any base station at all, and the signals of all other base stations are too weak for the wireless communication apparatus to be connected to.

The technique of band locking involves applying a setting by the wireless communication apparatus or by the user so that each of the multiple wireless interfaces of the wireless communication apparatus or each of the multiple wireless interfaces of the terminal device of the user would only connect to a subset of predetermined frequency bands and are forbidden to be connected to the rest of available frequency bands provided by a base station. By performing the technique of band locking, the number of candidate channels of the base station to be considered could be reduced so as to avoid executing unnecessary HO procedures. The above-described techniques could be especially helpful when the user is situated within a bullet train which is fast moving, and wireless communication apparatus or the terminal device of the user have to undergo handovers very frequently. Thus, by performing technique of multipath transmission and a technique of band locking, abnormal performances could be avoided or minimized by minimizing the overlaps of handover periods among different wireless interfaces.

It should be apparent to an ordinary person skilled in the art that while the inventive concept is described in terms of 4G and 5G communication protocols or base stations, the disclosure is not limited to 4G and 5G communication systems and may extend beyond.

To implement the above-described concepts, the disclosure provides a wireless communication apparatus, and the hardware block diagram of the wireless communication apparatus is shown in FIG. 1. As shown in FIG. 1, the wireless communication apparatus 100 includes but not limited to a control node 101 electrically connected to multiple wireless transceivers 111 112 ... 11N, and each of the multiple wireless transceivers is respectively connected to one of the antenna modules 121 122 ... 12N. Each of the antenna modules 121 122 ... 12N could be a single antenna or an antenna array. Also, each of the antenna modules 121 122 ... 12N could be turned to different resonant frequencies. Furthermore, each of the antenna modules 121 122 ... 12N may have different antenna configurations. For example, the first antenna module 121 have an omni-directional radiation pattern and is tuned to communicate with a 4G base station. For example, the second antenna module 122 could be an antenna array with at least one of the antenna having an omni-directional radiation pattern and is turned to communicating with a 4G base station and with the rest of the antennas forming a directional radiation pattern and is turned to communicating with a 5G base station. For example, the Nth antenna module 12N could be an antenna array with at least one of the antenna having an omni-directional radiation pattern and is turned to communicating with a 4G base station and at least one of the other antennas forming a omni-directional radiation pattern and is turned to communicating with a 5G base station. However, the disclosure is not limited to the above-described antenna configurations.

Each of the multiple wireless transceivers 111 112 . . . 11N may have one or multiple integrated transmitters and receivers or alternatively may have one or more sets of separate transmitter and receiver. Moreover, each receiver of the multiple wireless transceivers 111 112 . . . 11N are hardware circuits which could be capable of down-converting a received radio frequency (RF) signal or a microwave signal into a baseband frequency, and each of the transmitter of the multiple wireless transceivers 111 112 . . . 11N are hardware circuits which could be capable of up-converting a received baseband signal into a radio frequency or a microwave frequency. Since the hardware circuits are currently well-known, the exact circuits are not provided to avoid obscuring the disclosure. Alternatively, the multiple wireless transceivers 111 112 . . . 11N may merely function as repeaters located in different parts of a vehicle without any up-converting or down-converting capabilities. Each of the multiple wireless transceivers 111 112 . . . 11N could be connected to the control node 101 through a fiber, wireless, or wired connection.

For example, the first wireless transceiver 111 could be disposed at a front of a train carriage while the second wireless transceiver 112 could be disposed at a middle or a side of a train carriage and the third wireless transceiver 113 could be disposed at an end of a train carriage. Moreover, each of the antenna modules 121 122 . . . 12N could be pointed toward a different direction in order to maximize the reception and transmission capabilities of the wireless transceivers 111 112 . . . 11N. For example, the first antenna module 121 could be facing toward a front of a train carriage, the second antenna module 122 could be facing toward a side of a train carriage, the Nth antenna module 12N could be facing toward an end of a train carriage, and etc.

The control node 101 has a processor 104 electrically connected to and controls each of the multiple wireless transceivers 111 112 . . . 11N, a display panel 103 which could be optional, and a storage device 102 which could be optional. For example, the processor 104 may control the first wireless transceiver 111 to transmit and receive data on a first communication path and the second wireless transceiver 112 to transmit and receive data on a second communication path. The processor 104 would normally, by default, attempt to establish multiple communication paths including the first communication path on a first channel selected out of a first subset of channels of a first plurality of available channels for the first wireless transceiver 111 and the second communication path on a second channel selected out of a second subset of channels of a second plurality of available channels 112 or the second wireless transceiver.

Assuming that the processor 104 is to be transmitting a data packet, the processor 104 would then duplicate a data packet to be transmitted into N packets which are then transmitted by each of the multiple wireless transceivers 111 112 . . . 11N as a default way of operation. The first subset of channels and the second subset of channels are predetermined according to the band locking technique which is to be explained in further details. When performing handovers, the first wireless transceiver 111 is restricted to the first subset of channels and the second wireless transceiver 112 is restricted to the second subset of channels.

Further, the processor 104 may control the first wireless transceiver 111 to initiate a first handover (HO) procedure at a first time period (e.g., 511) by selecting, from the first subset of channels, a new channel, and may transmit, through the new channel, a second data packet on the first communication path after completing the first HO, and a second duplicated data packet of the second data packet on the second communication path which may remain on the second channel. Similarly, the processor 104 control the second wireless transceiver 112 to initiate a second HO procedure at a second time period (e.g. 512) which is different from the first time period (e.g. 511) by selecting, from the second subset of channels, another new channel and transmit, through the another new channel, a third data packet on the second communication path after completing the second HO as well as a third duplicated data packet of the third data packet on the first communication path which may remain on the third channel.

The processor 104 could be a central processing unit (CPU), a microprocessor, a microcontroller, a field programmable gate array (FPGA) unit, a graphics programming unit (GPU), a custom-made integrated circuit (IC), and etc.

The first subset of channels, the second subset of channels, . . . , the Nth subset of channels respectively correspond to the first wireless transceiver 111, the second wireless transceiver 112, . . . , and the Nth wireless transceiver, could be stored in the storage device 102. Each of the subset of channels could be stored as a setting information for each of its corresponding wireless transceiver. A user may be able to change the setting information by using a user interface on the display panel 103.

It is worth noting that each of the subset of channels corresponding to each the multiple wireless transceivers 111 112 . . . 11N could be location dependent. For instance, when a vehicle has traveled from a first location to a second location, the content (e.g., channels, frequency, etc.) of the first subset of channels may change accordingly. If a channel is available to a wireless transceiver is available but is not within the subset of channels, then the channel cannot be selected. For instance, assuming that the first wireless transceiver is configured to communicate with a 4G base station which has a set of available channels, only a subset of the set of available channels (i.e. first subset of channels) could be selectable during a HO procedure while the rest of the channels are forbidden. The first, second, . . . , Nth subset of channels could be predetermined based on one or more criteria such as to minimize overlapping of handover time periods between different wireless transceivers, to minimize packet loss rate of the multiple communication paths, to minimize latencies of the multiple communication paths, and etc. Overall, the setting information which includes the predetermined subset of channels are configured in a way that enable the wireless transceivers to have good chances at starting and/or finishing a HO procedure.

Figure 2:
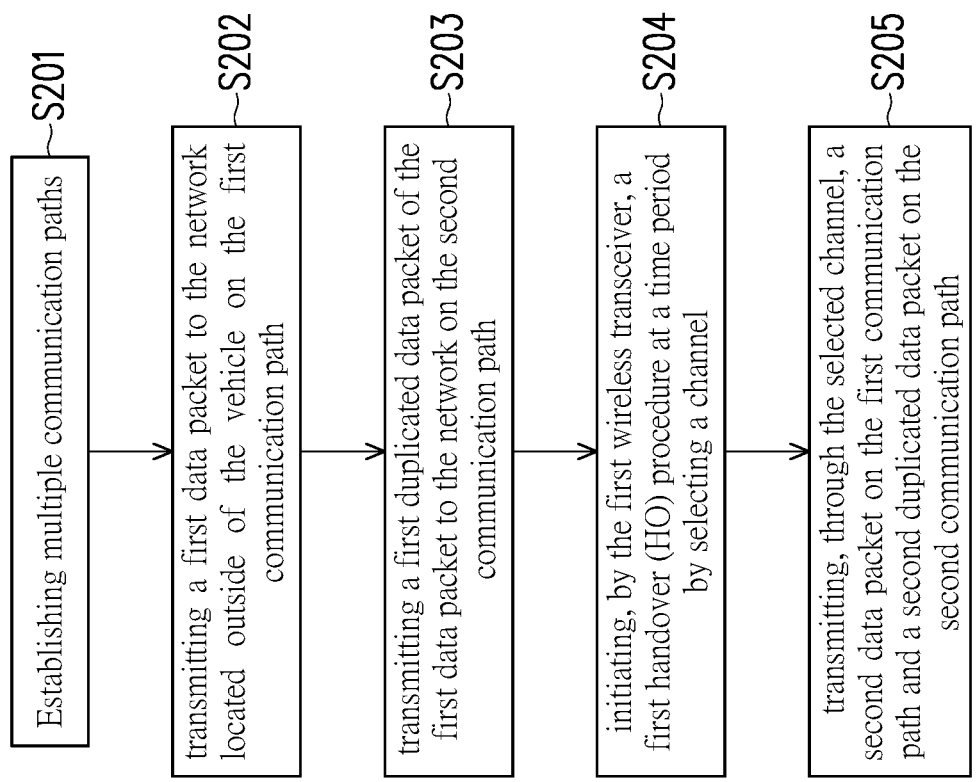
FIG. 2 is a flow chart which shows a wireless communication method performed by a wireless communication apparatus on a vehicle according to one of the exemplary embodiments of the disclosure.

FIG. 2 is a flow chart which shows a wireless communication method performed by a wireless communication apparatus on a vehicle according to one of the exemplary embodiments of the disclosure. In step S201, the wireless communication apparatus (e.g. 100) may establish, as a default mean of communication, multiple communication paths including the first communication path on a first channel selected out of a first subset of channels of a first plurality of available channels of the first wireless transceiver and the second communication path on a second channel selected out of a second subset of channels of a second plurality of available channels of the second wireless transceiver. In step S202, the wireless communication apparatus (e.g., 100) may transmit, via the first wireless transceiver, as the default mean of communication, a first data packet to the network located outside of the vehicle on the first communication path. In step S203, wireless communication apparatus (e.g., 100) may transmit, via the second wireless transceiver, as the default mean of communication, a first duplicated data packet of the first data packet to the network on the second communication path. In step S204, wireless communication apparatus (e.g., 100) may initiate, via the first wireless transceiver, a first HO procedure at a first time period by selecting, from the first subset of channels, a third channel. In step S205, wireless communication apparatus (e.g., 100) may transmit, through the third channel, a second data packet on the first communication path after completing the first HO, and a second duplicated data packet of the second data packet on the second communication path which remains on the second channel. Similarly, the wireless communication apparatus (e.g. 100) may further initiate, by the second wireless transceiver, a second HO procedure at a second time period which is different from the first time period by selecting, from the second subset of channels, a fourth channel and transmit, through the fourth channel, a third data packet on the second communication path in response to completing the second HO, and a third duplicated data packet of the third data packet on the first communication path which remains on the third channel.

The provided apparatus and method may achieve at least of the following advantages including reducing, the packet loss rate, enhancing the communications reliability, increasing system throughput, reducing the probability of packet delivery delay to be above a minimum threshold, and reducing the number of data retransmissions.

Each of the wireless transceivers may support at least one of a 3GPP cellular wireless communication standard such as 4G, 5G, 6G, and etc. Each of the wireless transceivers may support the same or different radio access technologies. Further, each of the wireless transceivers could be configured to select from a different subset of channels or frequencies. For example, the first wireless transceiver could be configured to select from a first subset of frequencies including frequency f1 and f2 while the second wireless transceiver could be configured to select from a second subset of frequencies including frequency f3 and f4. Alternatively, the first wireless transceiver could be configured to select from a first subset of frequencies including frequency f1, f2, f3, and f4 while the second wireless transceiver could be configured to select from a second subset of frequencies including frequency f1. The disclosure is not limited to any particular subset of frequencies for any of the wireless transceivers.

Among the plurality of wireless transceivers, one of the two wireless transceivers could be, for example, configured for the Long-Term Evolution (LTE)/5G dual-mode (e.g. non-stand-alone 5G radio or stand-alone dual-mode LTE/5G radio). Among the plurality of wireless transceivers, one wireless transceiver could be, for example, configured to use only LTE or 4G. Among the plurality of wireless transceivers, one wireless transceiver could be, for example, configured to use standalone 5G only. Among the plurality of wireless transceivers, one of the two wireless transceivers could be, for example, configured to use only LTE or 4G while the other wireless transceiver could be configured to use both 4G/LTE and 5G capabilities.

Among the plurality of wireless transceivers, one wireless transceiver could be configured to serve a telecommunication operation while another wireless transceiver could be configured to serve another telecommunication operator. Moreover, the method described in FIG. 2 could be applied in various scenarios including radio communications on a motor vehicle, on a motor bicycle, or on a train by users. Similarly, the method described in FIG. 2 may also be used by an operator controlling a train or a vehicle without drivers. The setting information for each wireless transceivers could be a part of a configuration which is predetermined based on a policy, based on measurement results of a learning phase, measurement results of previous data communication statistics, and etc. In this disclosure, there are multiple communication paths by default, and each communication path is conducted by a wireless transceiver. The multiple communication paths could be, 2 or more User Datagram Protocol (UDP) sessions, 2 or more Transmission Control Protocol (TCP) sessions, 2 or more QUIC sessions, 2 or more sessions with fixed of UDP/TCP/QUIC protocols, and etc.

Figure 3:
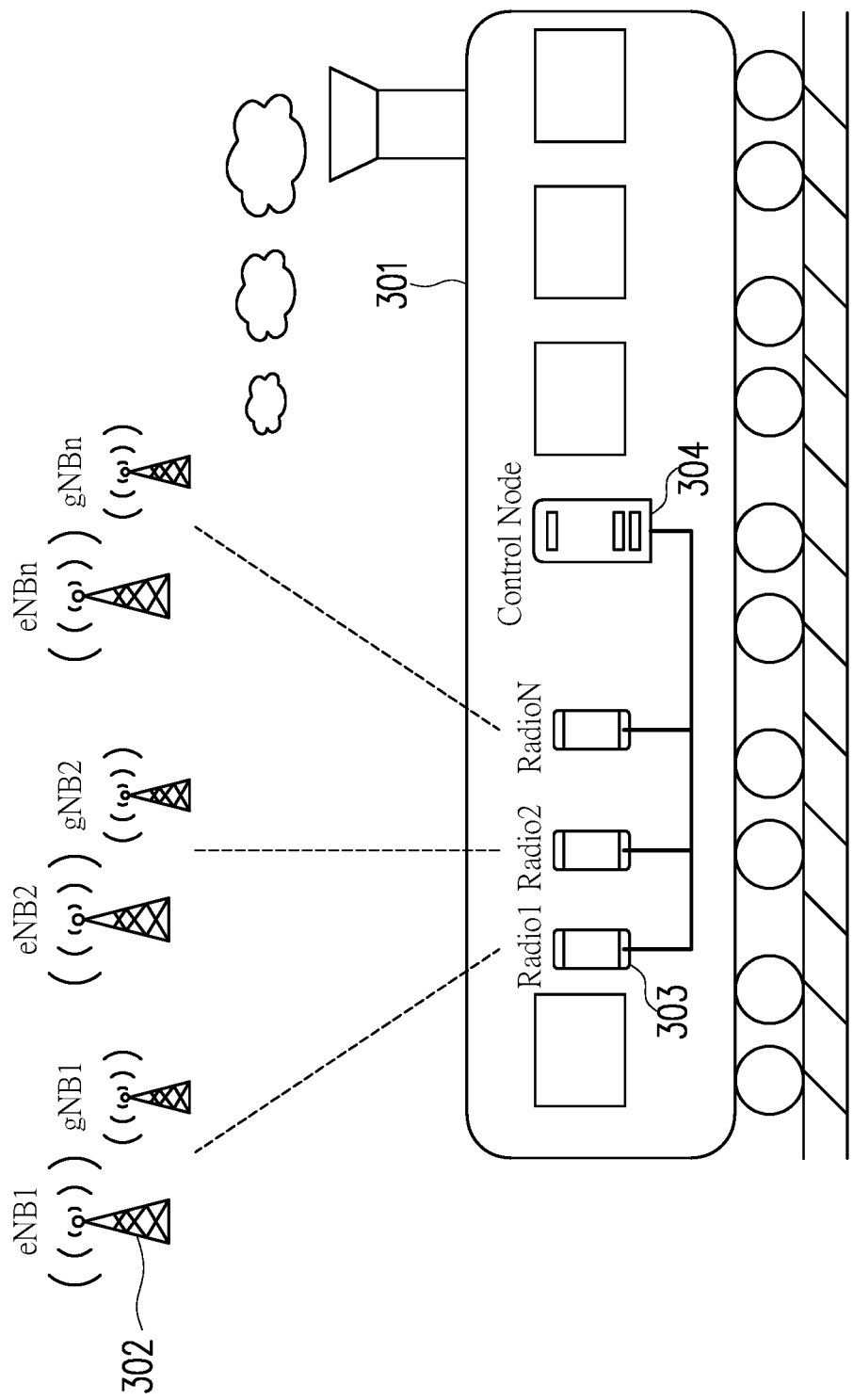
FIG. 3 illustrates a deployment scenario for the wireless communication apparatus according to one of the exemplary embodiments of the disclosure.
Figure 4:
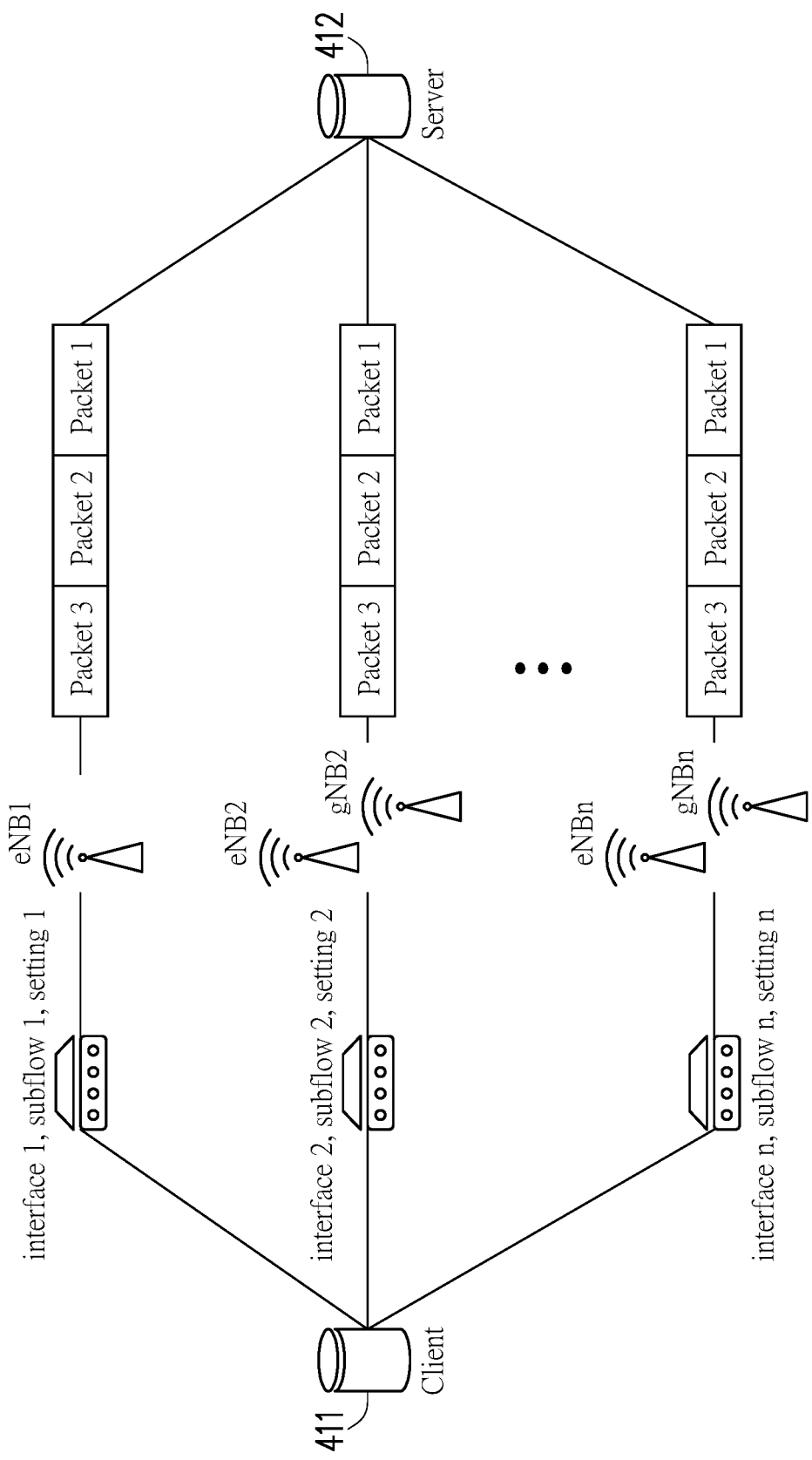
FIG. 4 illustrates an example of operating the wireless communication apparatus according to one of the exemplary embodiments of the disclosure.
Figure 5:
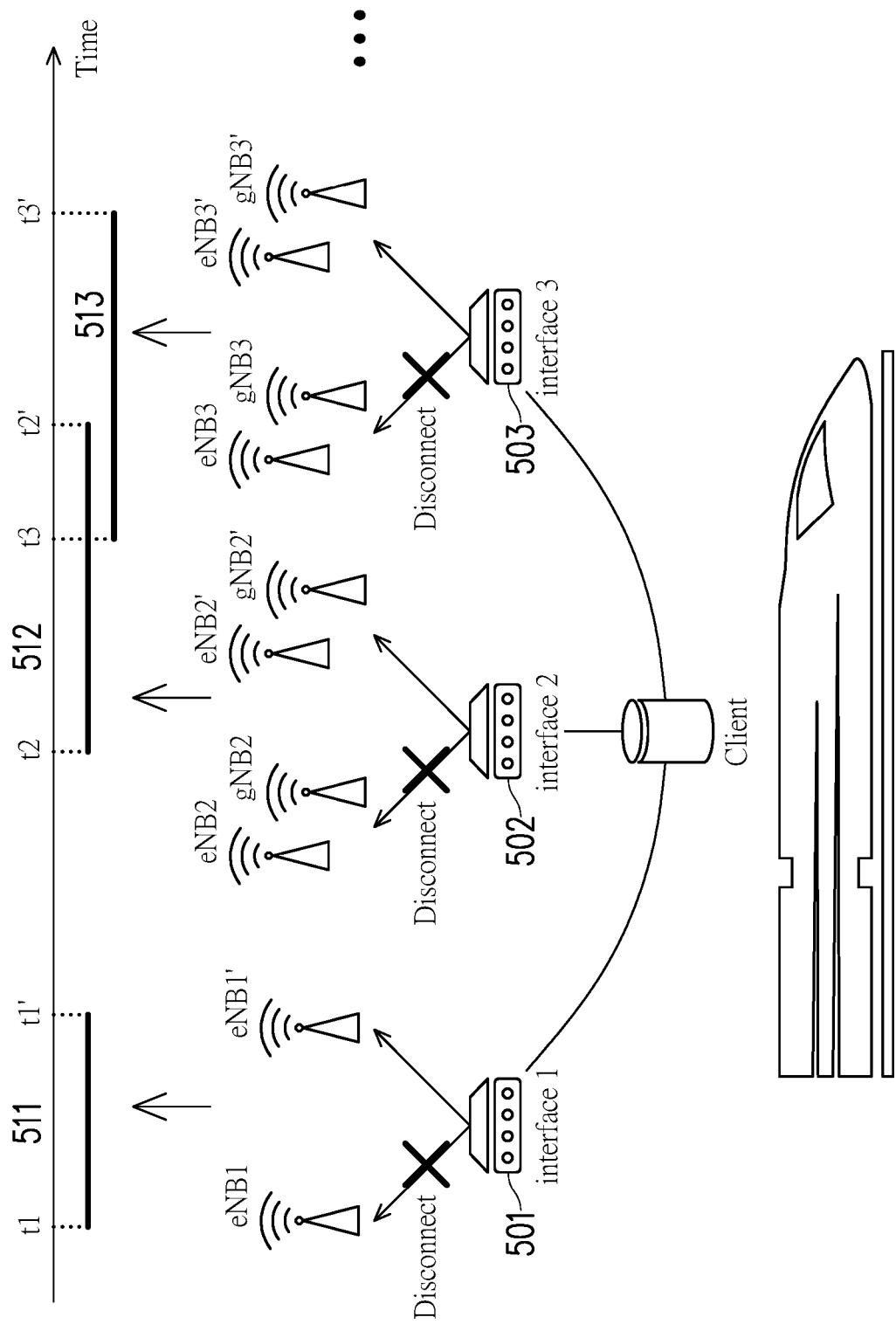
FIG. 5 illustrates handover scenarios of the wireless communication apparatus according to one of the exemplary embodiments of the disclosure.

In order to further elucidate the inventive concept, the disclosure provides an example as shown in FIG. 3~FIG. 5 and explained by the written descriptions corresponding to these figures.

A deployment scenario for the wireless communication apparatus is shown in FIG. 3. For the example of FIG. 3, a wireless communication apparatus (e.g., 100) could be disposed in a train 301. As the result of the train 301 being faster moving, frequent HO procedures could be executed among the base stations 302. Frequent HO events are the result of the train 301 moving quickly moves away from the coverage range of one base station into the coverage range of another base station. A plurality of wireless transceivers (i.e., radio 1, radio 2, . . . , radio N) 303 could be disposed in different sections of train 301 and are connected to a control node 304 (e.g., 101). Addition to each of the plurality of transceivers 303 being disposed in different sections of a carriage of the train 301, each antenna could be configured differently and are facing different directions. For instance, radio 1 of the transceivers 303 may have an omnidirectional antenna, radio 2 of the transceivers 303 may have an antenna array with a directional pattern configured to point toward the front of the train 301, radio 3 of the transceivers 303 may have an antenna array with a directional pattern configured to point toward the back of the train 301, radio 4 of the transceivers 303 may have an antenna array with a directional pattern configured to point toward one side of the train 301, and etc. Overall, one or more antenna could be configured to have an omnidirectional radiation pattern while one of more antennas could be configured to have a directional radiation pattern. Among the antennas configured to have directional radiation patterns, each antenna could be configured to point toward a different direction. Alternatively, at least one of the antennas could be configured to be spatially sweeping to cover different directions.

FIG. 4 illustrates an example of operating the wireless communication apparatus according to one of the exemplary embodiments of the disclosure. In the example of FIG. 4, the Client 411 which is a user who is assumed to be located inside a vehicle (e.g., 301) and would like to communicate with the Server 412 (e.g., the internet) through one's own terminal device such as a mobile phone, a laptop, a PDA, and etc. By applying the techniques of multipath transmission and the technique of band locking, the Client 411 would establish multiple communication paths which are shown as "subflows" in FIG. 4. Assuming that there are N communication paths with N being integer greater than 2, then there are subflow1, subflow2, ... subflowN, and etc. Each of the subflows are connected to a different hardware interface. The interface is either a transceiver of the Client 411's own device or one of the multiple wireless transceivers (e.g. 111 112 ... 11N) of the wireless communication apparatus 100. Thus, subflow 1 is communicated via interface 1, subflow 2 is communicated via interface 2, ..., subflow N is communicated via interface N, and etc.

When data packets (e.g., packet 1, packet 2, packet 3, and etc) are to be transmitted to the Server 412, the data packets are to be duplicated as duplicated or redundant data packets and transmitted to all the subflows. Thus, as shown in FIG. 5, as packet 1, packet 2, and packet 3 on subflow 1 are transmitted to the Server 412 via interface 1, the same pack 1, pack 2, and packet 3 are also transmitted on subflow 2 via interface 2, ..., on subflow N via interface N, and etc. Therefore, as a default way of communication, the disclosure would always seek to have at least two different communication paths by transmitting at least one duplicated or redundant packet unless it is impossible to establish multiple communication paths.

Further, each of the interfaces could be configured by a setting information (setting 1, setting 2, ..., setting N), and thus interface 1 could be configured by setting 1, interface 2 could be configured by setting 2, ..., interface N could be configured by setting N, and etc. Each of the setting information restrict each of the interfaces to hop to a smaller subset of frequencies or channels provided by a base station during a HO procedure. For instance, while interface 1 is connected eNB1, when interface 1 is performing a HO to eNB X where X is the eNB identifier (ID), and eNB X normal provides M channels to users attached with eNB X with M typically being an integer greater than 2, the setting information of setting 1 would restrict interface 1 to less than M channels when connected to eNB X in the future. Other setting information (setting 2, ..., setting N) also restrict their respectively interfaces in the same manner as setting 1. The setting information are predetermined as the restriction would ensure that the subflows are more stably maintained by avoiding the initiations of unnecessary handover procedures to inappropriate channels or frequencies. In other words, the inappropriate channels and frequencies are pre-screened out of the possibilities to consider when performing HO procedures.

FIG. 5 shows the HO procedure of the example of FIG. 4. It is assumed that interface 1 is a wireless transceiver which communicates with eNB 1. When subflow 1 could no longer be maintained due to the signals being weak, a HO procedure is initiated. The interface 1 would refer to settings 1 when looking for a candidate base station. The candidate base station could be determined, for example, based on whichever compatible base station having a highest signal strength or signal integrity. Also, the candidate base station could be restricted according to the setting information. Thus, assuming that interface 1 is located within a bullet train, then it is possible that eNB 1' as shown in FIG. 5 is the only candidate base station within setting 1 which would also restrict the number of available channels or frequencies that are available for interface 1 for selection during the HO procedure.

Further, it is assumed that interface 2 has been connected to eNB 2 which is a 4G base station and gNB 2 which is a 5G base station under LTE/5G dual connectivity (DC), interface 2 may attempt to continue to operate under DC by connecting to another set of 4G and 5G base stations during a HO event unless it is impossible to do so. If it is impossible for subflow 2 to main the DC connection, then interface 2 may attempt to connect to a 5G base station or a 4G base station only. Similarly, it is assumed that interface 3 has been connected to eNB 3 which is a 4G base station and gNB 3 which is a 5G base station under DC mode, interface 3 may attempt to continue to operate under DC by connecting to another set of 4G and 5G base stations during a HO event.

It is worth noting that the HO events for the subflows are likely to occur at different time periods by design (i.e. by carefully selecting the setting information related to achieving the purpose of band locking). For instance, as shown in FIG. 4, the HO procedure for interface 1 is initiated at t1 and completed at t1' and is thus performed during a first time period 511. The HO procedure for interface 2 is initiated at t2 and completed at t2' and is thus performed during a second time period 512. The HO procedure for interface 3 is initiated at t3 and completed at t3' and is thus performed during a second time period 513. Ideally, the setting information are preconfigured such that there is no overlap of the HO time periods. In other words, by attempt to ensure that the first time period 511, the second time period 512, and the third time period 513 do not overlap, the impact of the RLFs could be reduced since there would be at least one subflow that is still being maintained. However, practically it might not be possible to always avoid the overlaps of the HO time period, but the impact of the RLFs could still be reduced by pre-configuring the setting information for each of the interfaces in a way that minimize the overlaps of the HO time periods. The pre-configuring of the setting information would be further elaborated in the subsequent disclosure.

To better reduce the impact of the HO or RLF as described in the background section, the interfaces need to connect to different eNBs or gNBs when there is data traffic, as possible as they can. When connected to different eNBs or gNBs, the interfaces would then have higher probabilities to have non-overlapping HO-related intervals. Since HOs are highly related to the abnormal performance, abnormal performances could be avoided or minimized by configuring different interfaces in a way that have no overlaps under the technique of multipath transmission and the technique of band locking.

Next, the disclosure describes a procedure for determining a configuration for the wireless communication apparatus for performing the technique of band locking. For band locking settings, it restricts the interfaces of the Client 411 to connect to the Server 412 through a base station which has a range of available bands. For example, assuming that interface 1 is set to have the band locking setting "Telecom A, LTE band: {1,28}, NR band: {n78}", then interface 1 will only connect to Telecom A's eNodeBs (eNBs) using band 1 or band 28 or connect to a gNB's band n78 as the primary serving cell. Interface 1 will normally seek to have a 5G connection unless no 5G connection is available. Under such circumstance, interface 1 will have the 4G connection by connection to the eNB. The same may apply to other interfaces.

Assuming that telecom A is preselected in setting 1 as the band locking setting for interface 1, and there are $b_A$ available LTE bands as well as $n_A$ available NR bands, then in this situation, there will be $(2^{b_A}-1) \times 2^{n_A}$ different settings for the interface. For the settings for all the interfaces, there will be a lot more different configuration. Assuming that there are two available telecoms operators, Telecom A and Telecom B, and the interface will have $N_A = (2^{b_A}-1) \times 2^{n_A}$ different settings if the interface uses telecom A, and the interfaces will have $N_B=(2^{b_B}-1)\times 2^{n_B}$ settings if it uses telecom B. Assuming that there are only 2 subflows, subflow 1 and subflow 2, then there will be $N_A \times N_A$ possible settings if both two subflows use telecom A. On the other hand, there will be $N_A \times N_B$ possible configurations if two subflows use different telecoms.

There are many possible settings for an overall wireless communication apparatus, and the best setting could be different in different environments or in different locations. Furthermore, the best setting of multiple communication paths may also be different from the setting that has the best performance for a single-path. Therefore, the disclosure proposes a procedure of finding the best setting in the environment. It should be noted that there could be a variety of different techniques to find the best setting. The provided procedure only serves as example, but the disclosure is not necessarily limited to such procedure. The proposed procedure includes three phases: a before experiments phase, a during experiments phase, and a after experiments phase. Several experiments could be conducted to discover the best setting. In the disclose procedure, the experiments could be simplified and accelerated by using different devices as the client (e.g. 411) when conducting the experiments. The overall procedure is shown in FIG. 6.

Figure 6:
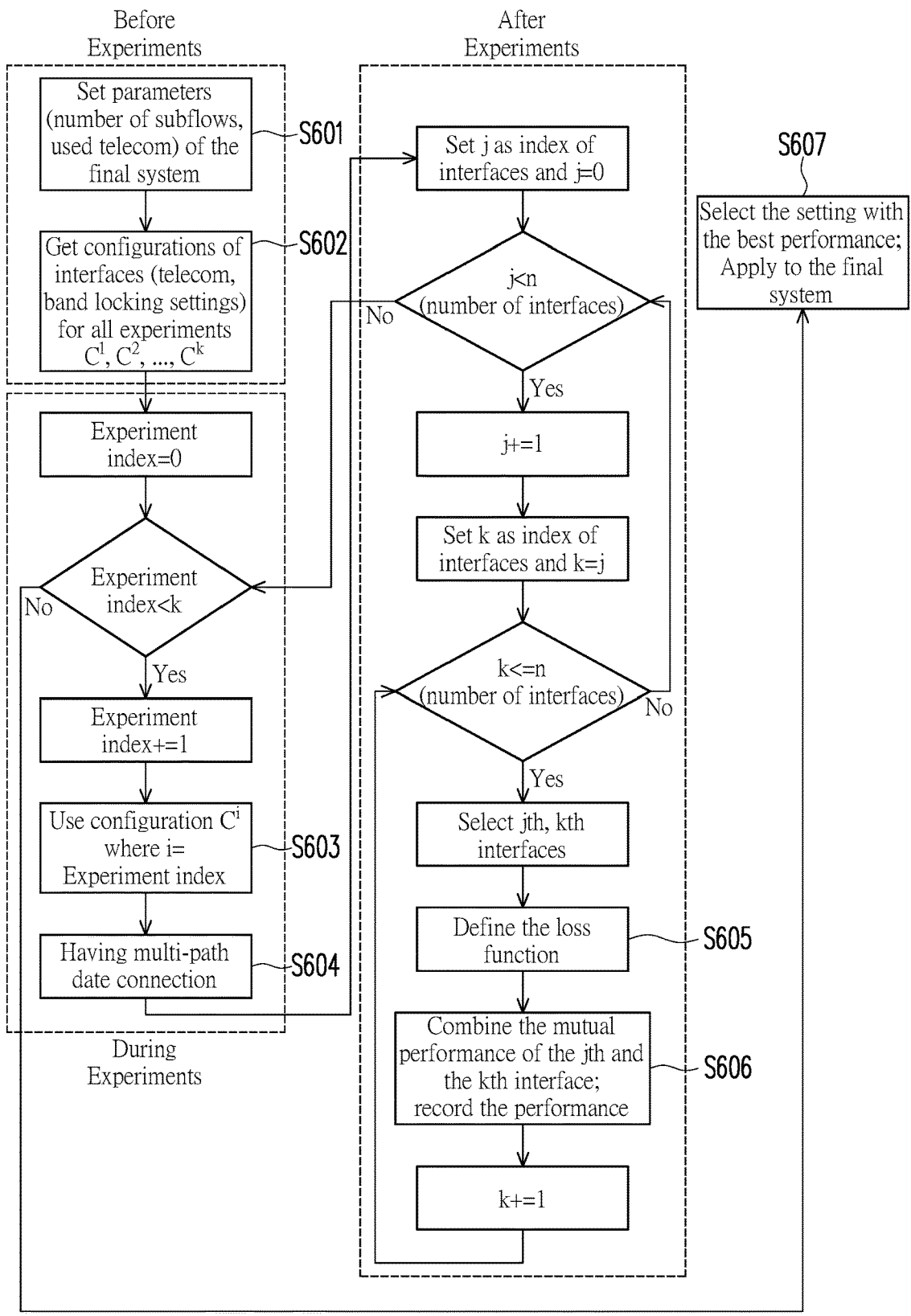
FIG. 6 is a flow chart which illustrates an example of measuring performing metrics to determine best settings per environment according to one of the exemplary embodiments of the disclosure.

During the before experiments phase, some parameters are defined all the interested configurations for the band locking settings are listed as described in step S601 of FIG. 6. In step S602, the configurations of interfaces for all experiments are obtained. The following example is provided for the reason of simplicity. Assuming that the finalized setting information is to include two subflows, and both subflows use the same telecom A. Assuming that the available bands for Telecom A are "LTE bands: {b1, b3, b28}, NR bands: {n78}," there will be $(2^3-1)\times 2=14$ different possible configurations for a single interface (as listed in Table 1). Suppose that the two subflows need to have different settings, there will be $C_2^{14}=91$ possible configurations for the interfaces of the system.

TABLE 1 possible settings for one interface in the example system

| b1 | b3 | b28 | b1, b3 | b1, b28 | b3, b28 | b1, b3, b28 |
|---|---|---|---|---|---|---|
| b1, n78 | b3, n78 | b28, n78 | b1, b3, n78 | b1, b28, n78 | b3, b28, n78 | b1, b3, b28, n78 |

For the experiments, another device could be used as another client to conduct the experiments. For example, the device can be a laptop connecting with cell phones via USB. The cell phones may apply USB tethering to share their wireless network to the laptop, and they will functions the interfaces for the laptop. Such device would need to have a number of interfaces that are greater or equal to that of the wireless communication apparatus to be deployed, the more interfaces the device has, the better.

Assuming the device has eight interfaces (n=8), then it can get outcomes for $C_2^8=28$ configurations simultaneously in one experiment. When combining the outcomes of two of the interfaces, the overall outcome of the configuration that the two interfaces use are obtained. More will be described for the after experiments phase. With the descriptions above, it will need approximately six experiments (k=6) to test all possible configurations for the finalized setting information for the wireless communication apparatus. For the jth experiment, there are configurations of interfaces $C_j=\{S_{j1}, S_{j2}, \ldots, S_{jn}\}$ (n=8 in this example.) The configurations for the interfaces for different experiments are listed below:

Experiment 1: ($S_{ji}$ refers to the setting of the ith interface for the ith experiment)

| $S_{11}$ | $S_{12}$ | $S_{13}$ | $S_{14}$ | $S_{15}$ | $S_{16}$ | $S_{17}$ | $S_{18}$ |
|---|---|---|---|---|---|---|---|
| b1 | b3 | b28 | b1, b3 | b1, b28 | b3, b28 | b1, b3, b28 | X (don't care) |

Experiment 2:

| $S_{21}$ | $S_{22}$ | $S_{23}$ | $S_{24}$ | $S_{25}$ | $S_{26}$ | $S_{27}$ | $S_{28}$ |
|---|---|---|---|---|---|---|---|
| b1, n78 | b3, n78 | b28, n78 | b1, b3, n78 | b1, b28, n78 | b3, b28, n78 | b1, b3, b28, n78 | X |

Experiment 3:

| $S_{31}$ | $S_{32}$ | $S_{33}$ | $S_{34}$ | $S_{35}$ | $S_{36}$ | $S_{37}$ | $S_{38}$ |
|---|---|---|---|---|---|---|---|
| b1 | b3 | b28 | b1, b3 | b1, b28, n78 | b3, b28, n78 | b1, b3, b28, n78 | X |

Experiment 4:

| $S_{41}$ | $S_{42}$ | $S_{43}$ | $S_{44}$ | $S_{45}$ | $S_{46}$ | $S_{47}$ | $S_{48}$ |
|---|---|---|---|---|---|---|---|
| b1, n78 | b3, n78 | b28, n78 | b1, b3, n78 | b1, b28 | b3, b28 | b1, b3, b28 | X |

Experiment 5:

| $S_{51}$ | $S_{52}$ | $S_{53}$ | $S_{54}$ | $S_{55}$ | $S_{56}$ | $S_{57}$ | $S_{58}$ |
|---|---|---|---|---|---|---|---|
| b1 | b3 | b28 | b1, b3 | b1, n78 | b3, n78 | b28, n78 | b1, b3, n78 |

Experiment 6:

| $S_{61}$ | $S_{62}$ | $S_{63}$ | $S_{64}$ | $S_{65}$ | $S_{66}$ | $S_{67}$ | $S_{68}$ |
|---|---|---|---|---|---|---|---|
| b1, b28 | b3, b28 | b1, b3, b28 | b1, b28, n78 | b3, b28, n78 | b1, b3, b28, n78 | X | X |

In order to reduce the number of experiments, there could be two possible ways to do in this phase: Set the number of interfaces of the testing device as many as possible. Reduce the number of our interested configurations for the final system. From the above example, if there is a new constraint that the band locking setting needs to have the NR n78, the number of possible configurations for a single interface will be reduced to $(2^3-1)\times(2-1)=7$. With the new constraint, we only need to have the experiment for one time to test all possible configurations. After having the configurations for the interfaces of all the experiments, the during experiments phase will begin which would use the configurations from the before experiments phase to conduct experiments.

Figure 7:
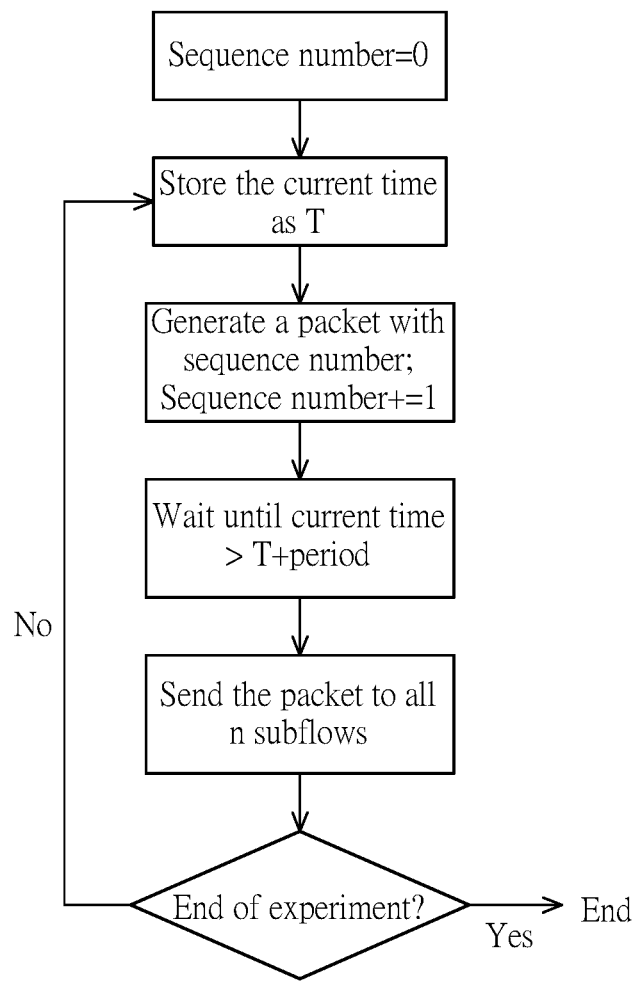
FIG. 7 a flow chart which illustrates a procedure for having a data connection according to one of the exemplary embodiments of the disclosure.

After getting the configurations of interfaces for all different experiments in step S602, a loop could be setup to iterate all experiments. In step S603, Configuration i is to be used. In this step, i (i=experiment index) is selected as the settings of the testing device's interfaces. For each of the interfaces, its telecom is set and has a band locking setting according to the configuration i. In step S604, multipath data connection is to be implemented. In this step, the testing device is required to have both an uplink (UL) (Client 411 to Server 412) and a downlink (DL) (Server 412 to Client 411) data connection to test the performance of each of the subflows. The procedure of having a data connection is shown in FIG. 7. The procedure shown in FIG. 7 is suitable for both the UL and the DL direction.

The rest of the procedures of the during experiments phase aims to have a periodical packet transmission where packets have sequence numbers and the numbers in order. Since the performance of configurations in the specific moving environment are to be discovered, the packets are sent periodically where each of the period could be fixed. In addition, as metrics such as packet loss rate are used as the parameters of the final loss function, the sequence numbers could be inserted in the payloads when generating packets.

The procedure of the during experiments phase could be accomplished using socket programming. The procedure may use both UDP or TCP as the traffic protocol, depending on what protocol the deployed wireless communication apparatus would use as well as what performance metrics are to be used in the after experiments phase. The performance metrics for UDP and TCP are different, and the performance metrics would include but not limited to latency (one-way latency; RTT, Round-Trip-Time) and packet loss rate for UDP and Goodput, RTT, and Re-transmission rate for TCP. As the experiments were being conducted, additional measurements on the client device could be made when there is a testing data connection. For example, the open-source tool Mobile Insight could be used to collect the lower layer control messages between the client device and the base stations. Some example performance metrics for the additional measurements include number of HOs, number of RLFs, length of disconnected intervals, etc.

The after experiments phase may begin after the data collection has been completed in the during experiments phase. The after experiments phase is mostly implemented by performing an offline analysis. However, the after experiments phase may also be performing while the system is still online. In this phase, each of the radio interfaces are selected. It is assumed that there are m interfaces for the client device in the wireless communication apparatus and there are n interfaces for the client device in the testing device. With the testing device, the data about the performance of the interfaces that have different settings could be collected. Assuming that data has been collected for CA different settings for the final system from one experiment. From the above example, m would be equivalent to two so that only a two-layer for-loops is needed to iterate the selection. On the other hand, if m is larger than two, a higher number-layer for-loops or a recursive function could be needed to generate all possible sets of selected interfaces.

Next, the loss function is to be defined (e.g., S605) and the performances of the interfaces are to be combined (e.g., S606). The loss function could be flexibly defined by a user and could be composed of one or more performance metrics. The loss function could be the weighted sum of the performance metrics, or a nonlinear function of the performance metrics. The better the performance is, the lower the value of the loss function needs to be.

Example loss functions:
L=average(packet loss rate)
L=average(RTT)
L=$W_1$*average(RTT)+$W_2$*average(packet loss rate), where $W_1$ and $W_2$ are weighted parameters, After the loss function has been defined, the combining of the performances of the interfaces will be made. For different performance metrics, the equations for computing mutual performance of the interfaces are different. In order to find the best configuration that have lowest packet loss rate and lowest latency, the determination for the packet loss and latency are made in the following examples.

A delay could be defined as a one-way latency, RTT. Because the multipath technique with duplicated or redundant packet is used, for packets with the same sequence numbers in the system, only the packet with the best performance is valid. That is, for the packets with the same sequence number s, their multipath delay will be the minimum of the delays from the selected interfaces:

$$\text{MultiPath Delay}(s) = \min_{i \in I_1, \dots, I_m} \text{Delay}_i(s),$$

where $I_1, \dots, I_m$ are the selected interfaces mentioned in the last step; $\text{Delay}_i(s)$ is the delay of the packet with sequence number s from interface i. The average of multipath delays of all sequence numbers could be used as the performance metric. Also "outage probability" may also be used as the performance metric, for which a threshold $\delta$ could be set, and the ratio of packets whose delays are over threshold could be computed.

As for the packet loss rate, for packets with the same sequence numbers in the system, the packets will be marked as successfully received if one of them is successfully received by the receiver. The equation could be defined as below:

$$\text{MultiPath Loss}(s) = \prod_{i \in I_1, \dots, I_m} \text{Loss}_i(s)$$

where $I_1, \dots, I_m$ are the selected interfaces; $\text{Loss}_i(s)$ indicates whether the packet with sequence number s from interface i is received by the receiver. Its value is one if the packet is lost and zero if the packet is not lost. Thus, The packet loss rate (number of unique packets not received/number of total transmitted unique packets) could be used as a performance metric.

Figure 8:
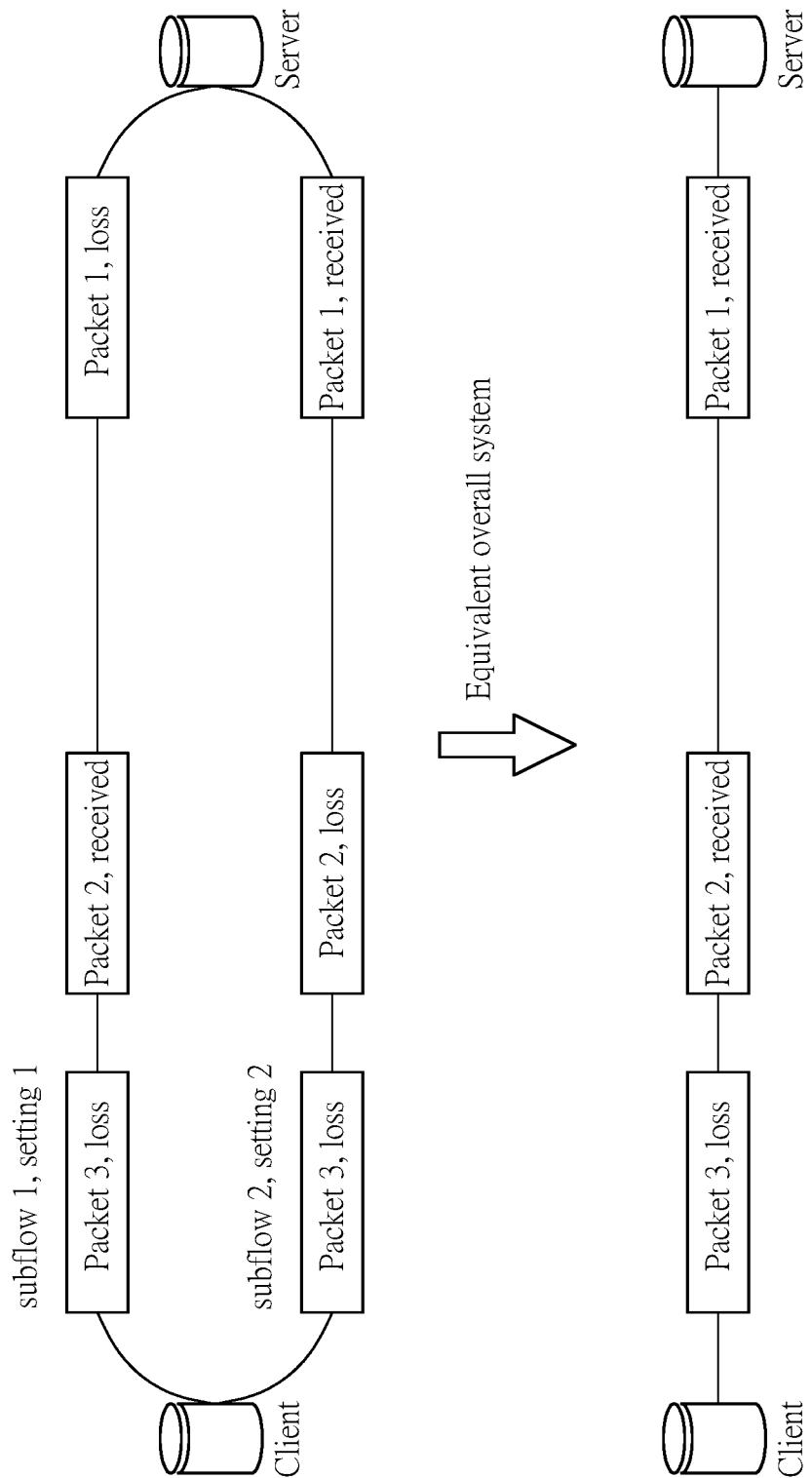
FIG. 8 illustrates the overall packet loss for the whole system according to one of the exemplary embodiments of the disclosure.
Figure 9:
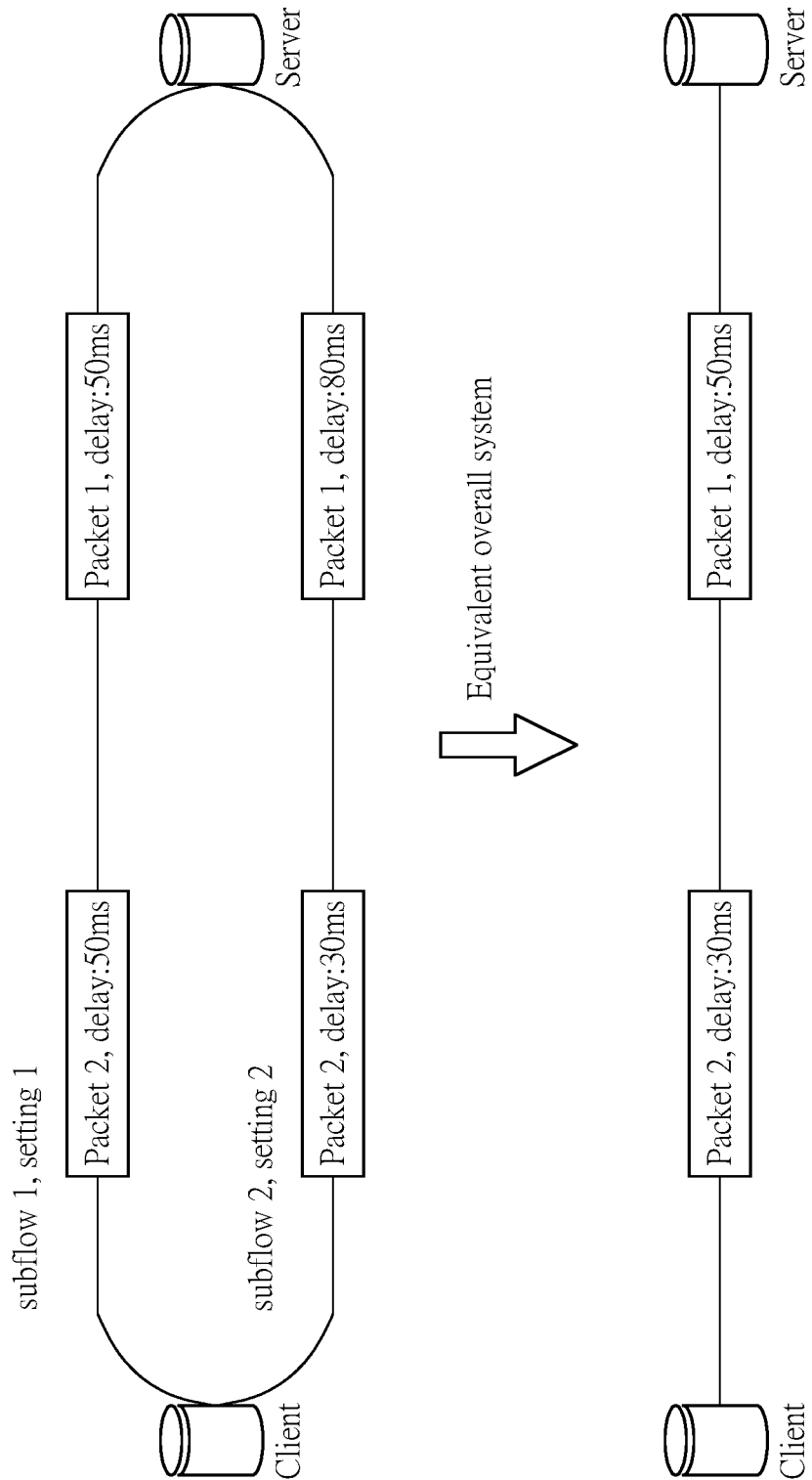
FIG. 9 illustrates the overall delay of the packets for the whole system according to one of the exemplary embodiments of the disclosure.

To better illustrate the above-described concept, FIG. 8 shows the overall loss of the packets for the whole system, and FIG. 9 shows the overall delay of packet for the whole system. As shown in FIG. 8, packet 1 is lost in subflow 1 which is configured under setting 1 but is received in subflow 2 which is configured under setting 2, then packet 1 is considered as to have been received. Also, packet 2 is received in subflow 1 which is configured under setting 1 but is lost in subflow 2 which is configured under setting 2, then packet 2 is considered as to have been received. Packet 3 which is both lost in subflow 1 which is configured under setting 1 and in subflow 2 which is configured under setting 2, the packet 3 is considered to have been lost.

As shown in FIG. 9, the delay for packet 1 in subflow 1 which is configured under setting 1 is 50 ms and the delay for packet 1 in subflow 2 which is configured under setting 2 is 80 ms, then the overall delay for packet 1 is the shortest of all the subflows which is 50 ms. Similarly, the delay for packet 2 in subflow 1 which is configured under setting 1 is 50 ms and the delay for packet 1 in subflow 2 which is configured under setting 2 is 30 ms, then the overall delay for packet 2 is 30 ms.

Next, the determination of abnormal or disconnect intervals is defined as follows:

$$\text{MultiPath Abnormal Intervals} = \bigcap_{i \in I_1,\ldots,I_m} \text{Abnormal Intervals}_i,$$

where $I_1, \ldots, I_m$ are the selected interfaces; AbnormalIntervals$_i$ indicates the abnormal intervals from interface i. AbnormalIntervals$_i$ may be the union of mathematical time intervals, such as $[t_1, t_2]$, $[t_3, t_4]$, where $t_1 < t_2 < t_3 < t_4$. As visualization, FIG. 6.c shows the multipath performance of disconnected intervals.

Figure 10:
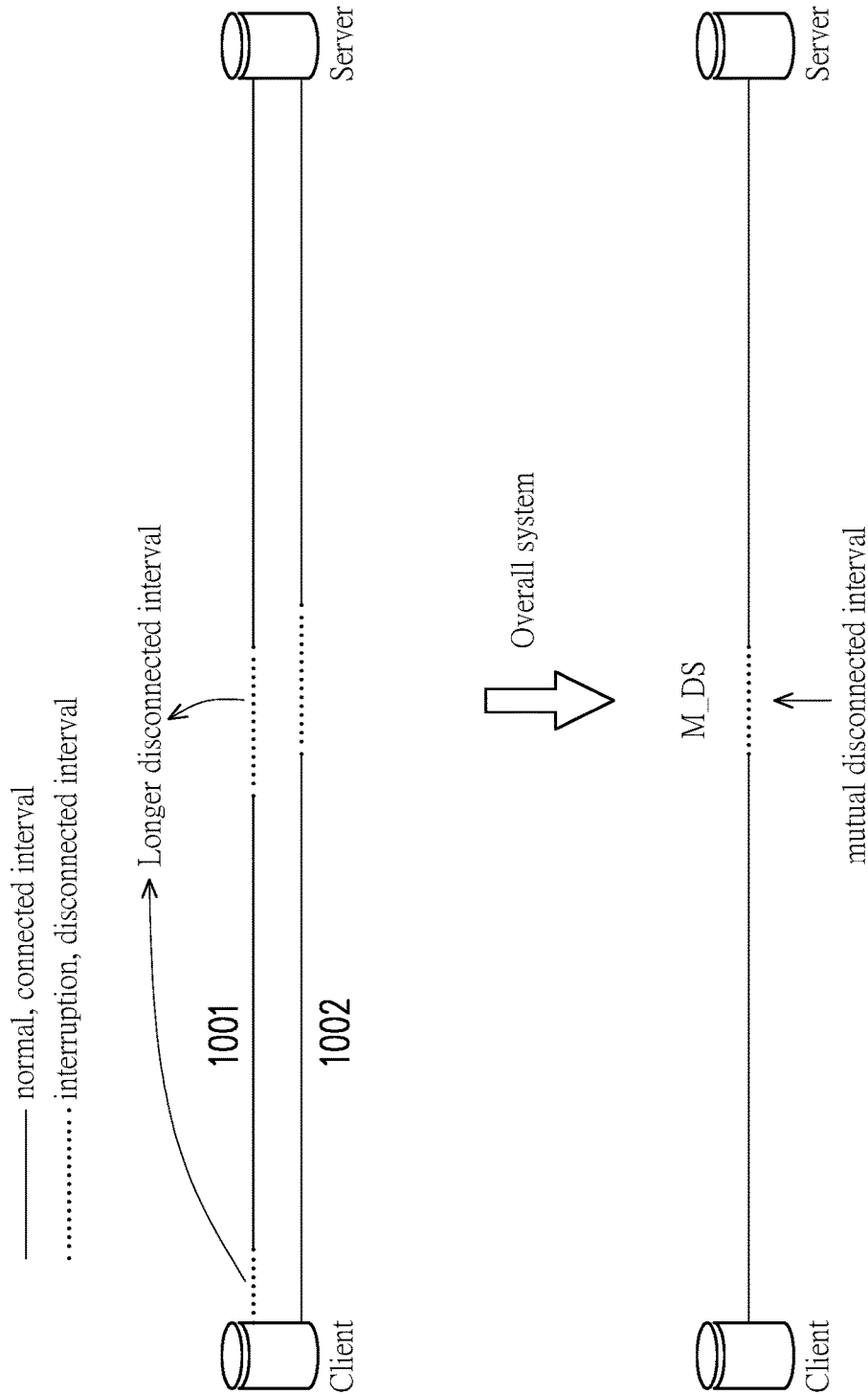
FIG. 10 illustrates the overall disconnected interval of the whole system according to one of the exemplary embodiments of the disclosure.

FIG. 10 shows a concept of mutually disconnected interval which may impact the whole system. As shown in FIG. 10, the solid lines are normal, connected intervals while the dotted lines are abnormal disconnected intervals which may occur during any HO event. For subflow 1, the disconnected interval in the example of FIG. 10 occurs slightly before the disconnected interval for subflow 2. The mutually disconnected interval M_DS is the overlapping between the disconnected interval for subflow 1 and the disconnected interval for subflow 2.

Under the technique of multipath transmission and the technique of band locking of the disclosure, the length of mutually disconnected intervals (i.e. a time period where all the subflows are disrupted) would impact the system performance while the disconnected intervals for a single subflow is safe guarded due to the redundancy of data packets under the technique of multipath transmission. The reason is that under the technique of multipath transmission, if there is at least one interface that is normal at that time, then the overall performance at the very moment would still be normal. That is, the overall multipath will be disconnected only if all subflows are disconnected simultaneously. Therefore, the multipath performance could be further described as follows.

Figure 11:
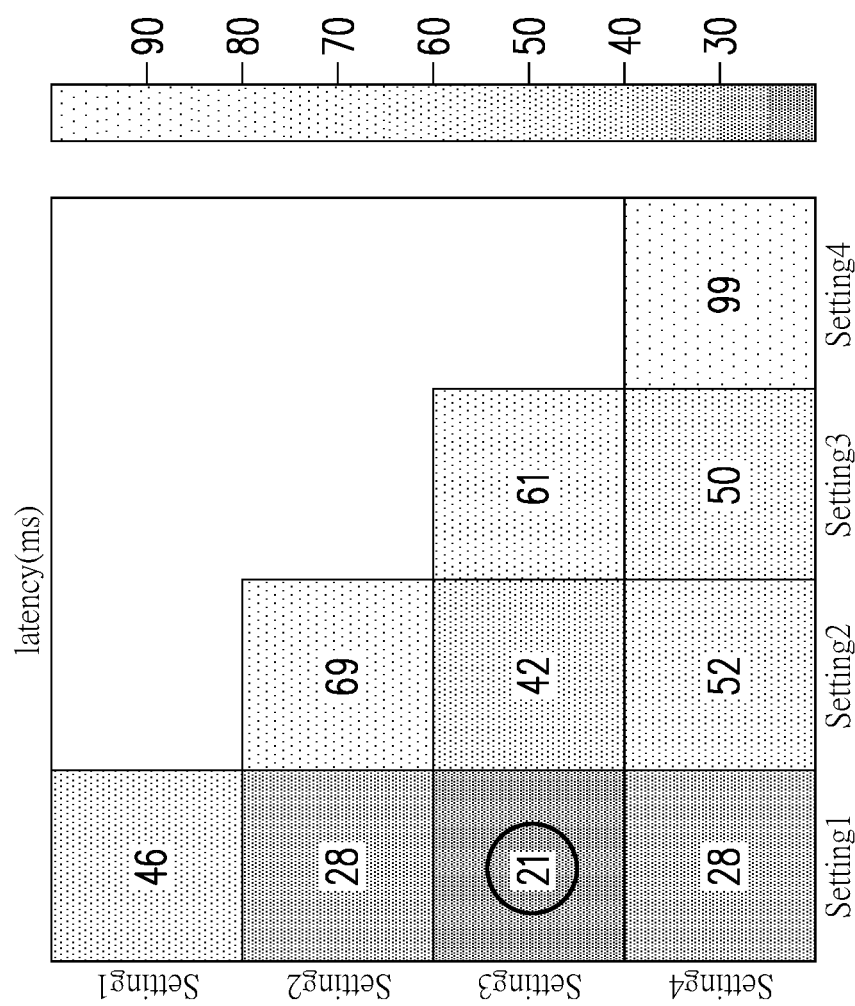
FIG. 11 illustrates the latency performance in a heatmap having four different settings according to one of the exemplary embodiments of the disclosure.

To select the best settings for the interface of the final wireless communication apparatus to be deployed, the settings with the best mutual performance would be chosen in the experiments by selecting the settings with the lowest loss function value. For the reason of simplicity of explanation, if the number of subflows for the final wireless communication apparatus is two, then a heatmap such as FIG. 11 could be used to visualize the loss function values. In practice additional heatmaps could be drawn to visualize performance metrics of different combination of settings. As shown in FIG. 11, assuming that the x axis stands for the settings used for subflow 1 and the y axis stands for the settings used for subflow 2, and a total number of settings have been experimented upon for both subflow 1 and subflow 2, then one settings combination would be selected. In the example of FIG. 11, it has been determined that setting 1 for subflow 1 and setting 3 for setting 2 have been determined as the best pairing to have the best latency performance.

Figure 12:
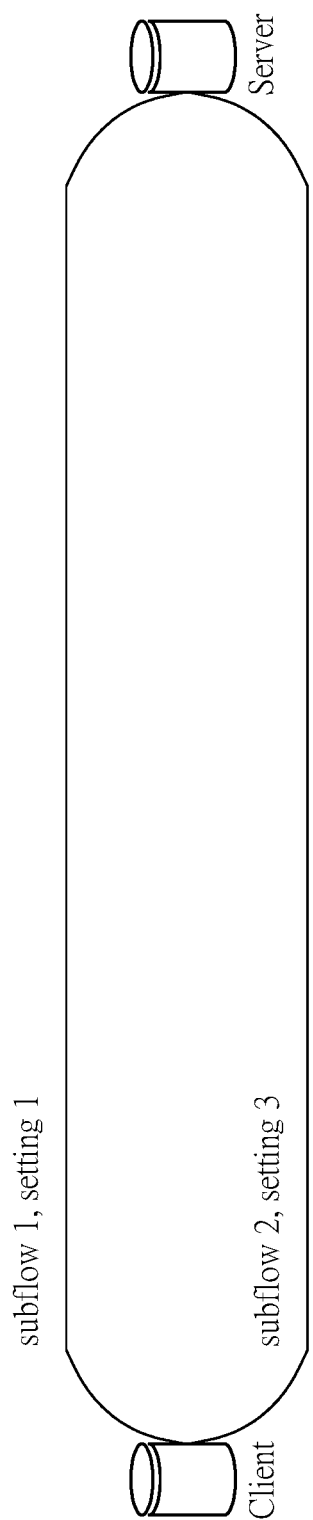
FIG. 12 illustrates an example of a best configuration according to one of the exemplary embodiments of the disclosure.

Referring back to FIG. 6, after the best settings combination for all the subflows have been determined, in step S607, such combination could be implemented in the wireless communication system to be deployed. FIG. 12 shows the implementation of the best pair combination of FIG. 11 so that subflow 1 is to be configured with setting 1 while subflow 2 is to be configured with setting 3.

In view of the aforementioned descriptions, the present disclosure is suitable for being used in a vehicle within which a wireless communication apparatus may undergo frequent handovers. The disclosure is able to achieve radio communication with base stations located outside of the vehicle while reducing handover failures and its related problems of data packet losses by reducing the overlaps of HO periods among the handover procedures of the multiple wireless transceivers.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless communication apparatus on a vehicle, the apparatus comprising:
   a first wireless transceiver configured to transmit and receive data on a first communication path,
   a second wireless transceiver configured to transmit and receive data on a second communication path, and
   a processor electrically connected to the first wireless transceiver and the second wireless transceiver and configured at least to:
      establish, as a default mean of communication, multiple communication paths comprising the first communication path on a first channel selected out of a first subset of channels of a first plurality of available channels of the first wireless transceiver and the second communication path on a second channel selected out of a second subset of channels of a second plurality of available channels of the second wireless transceiver,
      transmit by the first wireless transceiver, as the default mean of communication, a first data packet to the network located outside of the vehicle on the first communication path, transmit by the second wireless transceiver, as the default mean of communication, a first duplicated data packet of the first data packet to the network on the second communication path,
      perform, by the first wireless transceiver, a first handover (HO) procedure at a first time period by selecting, from the first subset of channels, a third channel, and
      transmit, through the third channel, a second data packet on the first communication path in response to completing the first HO, and a second duplicated data packet of the second data packet on the second communication path which remains on the second channel.

2. The wireless communication apparatus of claim 1, wherein the processor is further configured to:
   initiate, by the second wireless transceiver, a second HO procedure at a second time period which is different from the first time period by selecting, from the second subset of channels, a fourth channel; and
   transmit, through the fourth channel, a third data packet on the second communication path in response to completing the second HO, and a third duplicated data packet of the third data packet on the first communication path which remains on the third channel.

3. The wireless communication apparatus of claim 1, wherein the first wireless transceiver is configured for a first radio access technology, and the second wireless transceiver is configured for a second radio access technology.

4. The wireless communication apparatus of claim 3, wherein the first wireless transceiver is configured to communicate via a fourth generation (4G) communication technology, and the second wireless transceiver is configured to communicate via a fifth generation (5G) communication technology.

5. The wireless communication apparatus of claim 4, wherein the first communication path of first wireless transceiver is configured for single connectivity to communicate with a first 4G base station, and the second communication path of the second wireless transceiver is configured for dual connectivity to communicate with a second 4G base station and a 5G base station.

6. The wireless communication apparatus of claim 1 further comprising
   a third wireless transceiver configured to transmit and receive data on a third communication path, and the processor is further configured to:
   transmit, by the transmit by the third wireless transceiver, as the default mean of communication, another duplicated data packet of the first data packet to the network on the third communication path.

7. The wireless communication apparatus of claim 2, wherein the processor is further configured to:
   initiate, by the third wireless transceiver, a third HO procedure at a third time period by selecting, from a third subset of channels, a fifth channel; and
   transmit, through the fifth channel on the third communication path, a fourth data packet in response to completing the third HO.

8. The wireless communication apparatus of claim 7, wherein the first time period does not overlap with the second time period.

9. The wireless communication apparatus of claim 7, wherein the second time period partially overlaps with the third time period.

10. The wireless communication apparatus of claim 1, wherein the selecting, from the first subset of channels, the third channel comprising:
    restricting all of the first plurality of available channels except for the first subset of channels when selecting from the first subset of channels.

11. The wireless communication apparatus of claim 5, wherein the second plurality of available channels include all available channels of the 4G communication technology and all available channels of the 5G communication technology, and selecting, from the second subset of channels, the fourth channel comprising:
    restricting all of the second plurality of available channels except for the second subset of channels when selecting from the second subset of channels, wherein the second subset of channels include some channels of all available channels of the 4G communication technology and some channels of all available channels of the 5G communication technology.

12. The wireless communication apparatus of claim 11, wherein the fourth channel is a channel of the second 4G base station, and the processor is further configured to:
    select, from the second subset of channels, a channel of the 5G base station for the dual connectivity.

13. The wireless communication apparatus of claim 1, wherein the first wireless transceiver and the second wireless transceiver are located in different locations of the vehicle, the first wireless transceiver includes a first antenna array of a first radiation pattern, and the second wireless transceiver includes a second antenna array of a second radiation pattern.

14. A wireless communication method performed by the wireless communication apparatus on a vehicle, the wireless communication apparatus includes a first wireless transceiver configured to transmit and receive data on a first communication path, a second wireless transceiver configured to transmit and receive data on a second communication path, and a processor electrically connected to the first wireless transceiver and the second wireless transceiver, the method comprising:
    establishing, as a default mean of communication, multiple communication paths comprising the first communication path on a first channel selected out of a first subset of channels of a first plurality of available channels of the first wireless transceiver and the second communication path on a second channel selected out of a second subset of channels of a second plurality of available channels of the second wireless transceiver;
    transmitting by the first wireless transceiver, as the default mean of communication, a first data packet to the network located outside of the vehicle on the first communication path;
transmitting by the second wireless transceiver, as the default mean of communication, a first duplicated data packet of the first data packet to the network on the second communication path;
    performing, by the first wireless transceiver, a first handover (HO) procedure at a first time period by selecting, from the first subset of channels, a third channel; and
    transmitting, through the third channel, a second data packet on the first communication path in response to completing the first HO, and a second duplicated data packet of the second data packet on the second communication path which remains on the second channel.

15. The wireless communication method of claim 14 further comprising:
    performing, by the second wireless transceiver, a second HO procedure at a second time period which is different from the first time period by selecting, from the second subset of channels, a fourth channel; and
    transmitting, through the fourth channel, a third data packet on the second communication path in response to completing the second HO, and a third duplicated data packet of the third data packet on the first communication path which remains on the third channel.

16. The wireless communication apparatus of claim 2, wherein the wireless communication apparatus further includes a storage device storing information comprising the first subset of channels of the first plurality of available channels and the second subset of channels of the second plurality of available channels which are predetermined.

17. The wireless communication apparatus of claim 16, wherein the first plurality of available channels and the second subset of channels of the second plurality of available channels are predetermined based on minimizing overlapping in time between the first time period and the second time period.

18. The wireless communication apparatus of claim 16, wherein the first plurality of available channels and the second subset of channels of the second plurality of available channels are predetermined based on minimizing packet loss rate of the multiple communication paths including the first communication path and the second communication path.

19. The wireless communication apparatus of claim 16, wherein the first plurality of available channels and the second subset of channels of the second plurality of available channels are predetermined based on minimizing data latencies of the multiple communication paths including the first communication path and the second communication path.

20. The wireless communication apparatus of claim 16, wherein the wireless communication apparatus further includes a control node through which the configurations associated with the first plurality of available channels and the second subset of channels of the second plurality of available channels are changeable.

* * * * *